Figure 6:
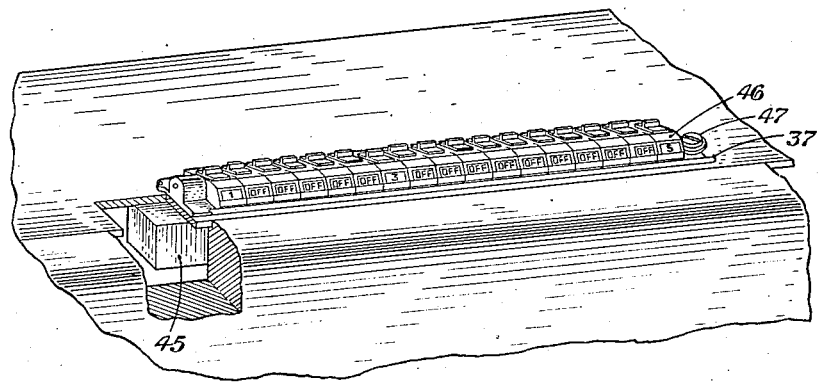

July 7, 1936.    E. A. SLYE    2,046,433
REGISTER
Filed Aug. 2, 1932    2 Sheets-Sheet 1
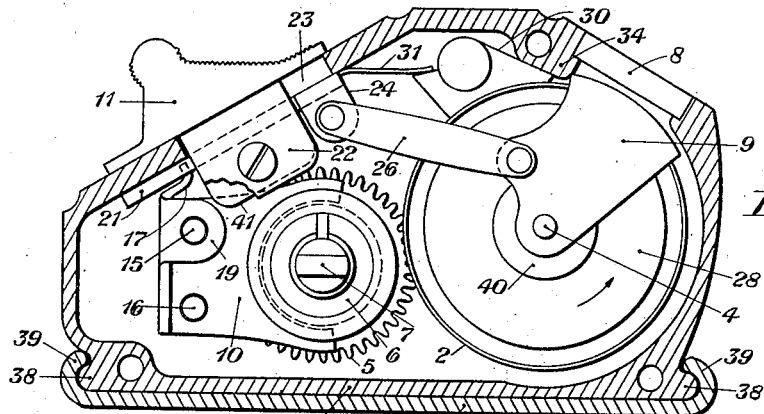
Fig. 1
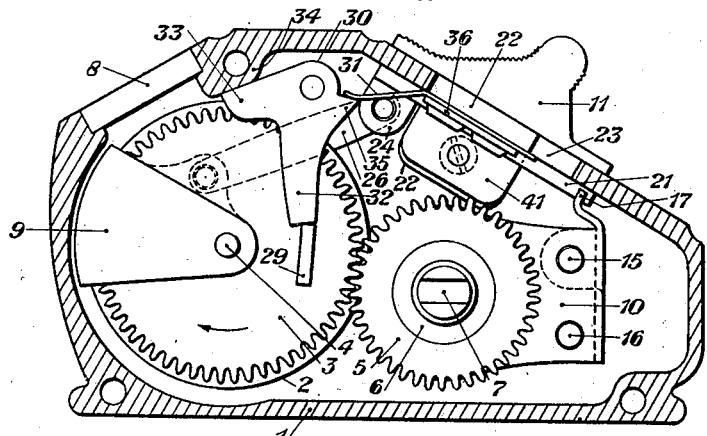
Fig. 2
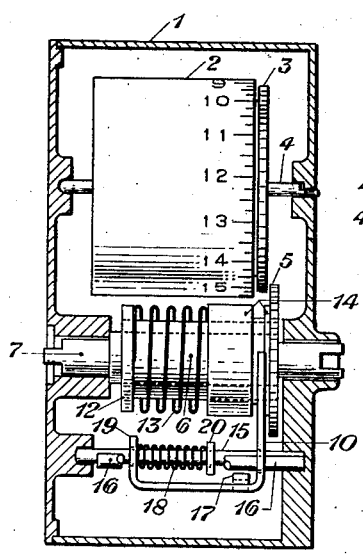
Fig. 3
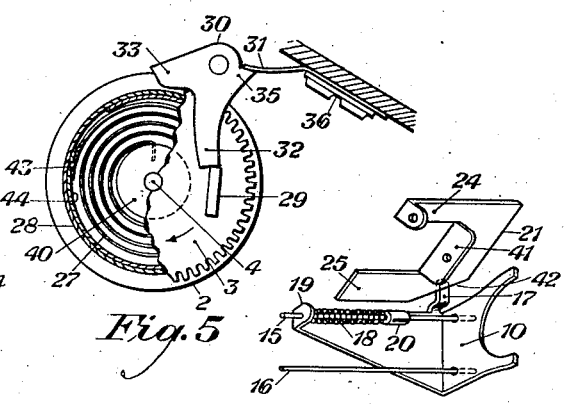
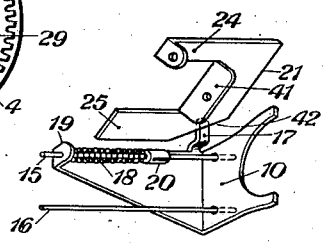
Fig. 5
Fig. 4
INVENTOR
E. A. Slye
BY
W. Clark Floyd
ATTORNEY July 7, 1936.  E. A. SLYE  2,046,433
REGISTER
Filed Aug. 2, 1932  2 Sheets-Sheet 2

INVENTOR
E. A. Slye
BY
ATTORNEY

Patented July 7, 1936

2,046,433

UNITED STATES PATENT OFFICE

2,046,433

REGISTER

Edward A. Slye, East Hartford, Conn., assignor to Veeder-Root Incorporated, Hartford, Conn.

Application August 2, 1932, Serial No. 627,287

11 Claims. (Cl. 235—144)

This invention relates to measuring devices, and more particularly to apparatus forming a part of such devices for rendering said devices operative and inoperative, as desired, and for resetting the measuring wheels thereof to their zero positions.

Heretofore, in registers for measuring the number or the elapsed time of various operations or for measuring distances as in the case of cyclometers, difficulty has been experienced in devising operating and control apparatus therefor which permits the measuring or dial wheel to be rotated through any part of a revolution or through any number of revolutions and which at the same time is capable of restoring the measuring or dial wheel to its zero position from any off-normal position. One object of the present invention is to provide a register in which is combined novel operating and control apparatus for efficiently accomplishing the above results.

Also, where gears and shifting means for causing the engagement and disengagement of the gears have been used in registers of the types mentioned above, difficulty has been experienced heretofore in preventing damage to the gear teeth and in preventing inaccurate registration, when the gears come in contact with each other at a time when the teeth thereof are not in exact meshing position. Another object of the present invention is to provide a register in which these disadvantages are overcome.

Also, where gears and shifting means have been used in the types of registers mentioned above, difficulty has been experienced heretofore in devising means which permit the full operation, or release as the case may be, of the shifting means and shifting control means when the gears are not at the moment in exact meshing position, and which, without anything further being done by the operator, cause the engagement of the gears when they are later in meshing position. Another object of the present invention is to provide a register in which is combined novel means for accomplishing this result.

Further objects and features of the invention will be apparent from the detailed description hereinafter set forth.

For convenience the invention is shown and described in connection with an elapsed time register which is adapted to be operated by a continuously rotating driving shaft. Figure 1 of the drawings is a side view of the register with the side of the case removed, the register being in its normal, inoperative condition; Fig. 2 is a view of the register from the other side with the side of the case removed, the register being in its operative condition; Fig. 3 is a view of the register from the bottom, with the bottom of the case removed, showing the dial wheel, the driving mechanism and the shifting mechanism; Fig. 4 is a perspective view of the shifting mechanism; Fig. 5 is a view of the dial wheel, a portion of which is cut away, and the reset mechanism; and Figure 6 is a schematic illustration of the manner in which a plurality of measuring devices may be associated with and driven by a common driving means for the purpose of measuring individually a plurality of intermittent and simultaneous operations.

As shown in the drawings, the apparatus consists, in general, of a case 1, the front of which is shown at the right in Fig. 1 and at the left in Fig. 2, a figure or dial wheel 2, a cog-wheel gear 3 connected to the dial wheel, a cog-wheel driving gear 5, a driving shaft 7, shifting means including a shifting fork 10 to cause said driving gear to engage gear 3 of the dial wheel, shifting control means 11 to control the operation of said shifting means, a shutter 9 to indicate whether the register is in its operative or inoperative condition, and reset mechanism to restore said dial wheel to its normal or zero position. The dial wheel is mounted on a shaft 4 which, in turn, is supported within the case, as indicated in Fig. 3. The position of the dial wheel within the case with respect to window 8 is such that a part of its periphery is visible therethrough and its position with respect to the driving mechanism is such that when driving gear 5 is shifted laterally toward said dial wheel, the teeth of driving gear 5 are adapted to mesh with the teeth of gear 3. Driving shaft 7 and driving gear 5 of the register are adapted to be rotated continuously at a predetermined speed, for example, by means of a constant speed, synchronous motor. Such a motor is shown at 45 in Figure 6 and may be, for example, of the type disclosed in Patent Nos. 1,283,432, 1,283,433 and 1,283,435, issued to Henry E. Warren on October 29, 1918. As a result when the teeth of the driving gear 5 mesh with the teeth of gear 3, the dial wheel is rotated at a constant speed in the direction indicated by the arrows. The periphery of the dial wheel may be divided into a plurality of divisions representing minutes and/or fraction-minutes with numerals designating said divisions. A hair-line or other gauging means may be provided across the window to facilitate the accurate reading of the elapsed time measured by the apparatus. Shutter 9 rotatably mounted on the dial wheel shaft and controlled by shifting control means 11 is provided to indicate independently of the position of the dial wheel whether the register is in its operative or inoperative condition. When the register is in its inoperative condition, the shutter is adapted to be positioned (see Fig. 1) between window 8 and the periphery of the dial wheel so that only the shutter is visible through said window. When the register is in its operative position, the shutter is adapted to be moved to a position such as that shown in Fig. 2 so that the dial wheel is visible through said window.

The driving mechanism includes driving gear 5, hub 6, drive collar 12, gear hub spring 13, shifting hub 14, and driving shaft 7. As shown in Fig. 3, gear 5 is fixed to one end of hub 6 and drive collar 12 is fixed to the other end. The hub itself is mounted on driving shaft 7 and is adapted to rotate therewith. Shifting hub 14 is slidably mounted on hub 6 adjacent gear 5. Hub spring 13 is wound round hub 6 between driving collar 12 and shifting hub 14. Shifting fork 10 of the shifting mechanism is positioned so that its prongs fit in a groove in shifting hub 14 in the manner indicated in Fig. 3. As stated above, driving shaft 7 is continuously rotated at a predetermined speed. As a result, driving gear 5, hub 6 and driving collar 12 continuously rotate with shaft 7 at a predetermined speed. When shifting fork 10 is moved laterally to the left, it causes shifting hub 14 to be moved laterally to the left. This movement of the shifting hub exerts pressure, by means of spring 13, on driving collar 12 which causes said driving collar, hub 6 and driving gear 5 to be moved to the left in the direction of their axis. As a result, the rotating gear 5 comes in contact with stationary gear 3. If, at the movement of contact, the teeth of the two gear wheels should be in such relative position that they mesh, the teeth of gear 5 slip into position and the rotation of gear 3 and dial wheel 2 begins immediately. If, at the moment of contact, said teeth are not in meshing position, the teeth of gear 5 will press against the teeth of gear 3. However, since spring 13 is compressible, it acts more or less as a cushion spring and permits shifting fork 10 and shifting hub 14 to move to their full, operated position, even though gear 5 is held outside of gear 3. At the same time, spring 13 being now compressed, continues to exert pressure on the drive collar 12 which, in turn, causes gear 5 to continue to press against gear 3. When gear 5 rotates to a position such that the teeth of the two gears are in a meshing position, gear 5 slips into engagement with gear 3 under the influence of the force exerted by spring 13, which causes gear 3 and dial wheel 2 to begin rotating. In other words, when the shifting means is released at a time when the gear teeth are in exact meshing position, the entire force present in spring 18 is used to move the gear 5 to its full engaging position, but when the shifting means is released at a time when the gear teeth are not in meshing position, a part of the force present in spring 18 is used to move gear 5 to a position such that the teeth thereof merely come in contact with the teeth of gear 3 and the remaining part of said force is transferred, so to speak, to spring 13. Later, when the teeth are in meshing position, the force now present in spring 13 is used to move gear 5 to its full engaging position. Therefore, it can be seen that this feature permits the operation of the shifting means and the shifting control means to their operated positions without waiting for the driving gear to rotate to a position such that its teeth will mesh with the teeth of the gear of dial wheel. The fact that gears 3 and 5 are of the cog-wheel type and the fact that gear 5 is moved in the direction of its axis into engagement with gear 3 prevent any movement of the dial wheel until the teeth of the gears exactly mesh and actually engage each other. As a result any inaccuracy in timing, due to the fact that the gears do not at once mesh, will not result in over-registration. For example, if the gears were of the crown-gear type and gear 5 were moved in the direction of its axis into engagement with gear 3, and if at the moment of contact the tips of the teeth of gear 5 should come in contact with and press against the rear inclined sides of the teeth of gear 3, dial wheel 2, since it is free to rotate in a forward direction on its axis, would immediately rotate in a forward direction until the teeth of the two gears exactly mesh. On the other hand, if the gears were of the cog-wheel type and gear 5 were moved in a direction at right angles to its axis to engage gear 3, the same result would follow. The arrangement of the gears as disclosed herein has the further advantage over ordinary gear arrangements in that it prevents damage to the gear teeth when they come in contact with each other. For instance, if the gear arrangement were similar to that of either of the examples noted above and if the gear 5 were rotating at a comparatively high speed at the moment, when the tips of the gear teeth came in contact with each other, said tips would likely be damaged or broken off or the gears might even be completely stripped. In the arrangement disclosed, the tips of the gear teeth never come in contact with each other and hence this danger is not present.

The shifting mechanism includes a shifting fork 10, slidably mounted on bars 15 and 16, shifting fork stud 17 and spring 18 wound around bar 15. As indicated above, the shifting mechanism is positioned in the case beneath shifting control means 11 and in such position with respect to the driving mechanism that its prongs fit in the groove of hub 14. Spring 18 is adapted to be compressed between the collar 19 of the fork 10 and lug 20, when said fork is shifted to the right, as shown in Figs. 3 and 4. Fork 10 is held in its normal position to the right, against the force exerted by spring 18, by means of shifting cam 21, which is connected to and controlled by shifting control means 11.

The shifting control means is a control lever 11, slidably mounted on the outside of the case, at the rear thereof. The lower part of said lever, indicated at 22, is adapted to pass through a slot 23 in the case directly beneath said lever and is adapted to move back and forth in said slot as said lever is moved to its normal and operated positions. The lower part of said lever is also adapted to fit in between the collars 24 and 25 of shifting cam 21 and to be fastened to collar 41 of said cam, so that said cam moves back and forth in accordance with the movement of said lever. When lever 11 and shifting cam 21 are in their normal or rear positions, the inclined edge 42 of said cam holds stud 17 and fork 10 in their normal positions, at the right as shown in Figs. 3 and 4. When lever 11 and cam 21 are shifted to their operated or forward positions, the inclined edge 42 permits the movement of stud 17 and fork 10 to the left under the influence of spring 18. As stated above, when fork 10 is in its normal position to the right, the gears are disengaged and when said fork is shifted to the left, the gears are engaged. Connected between collar 24 and shutter 9 is a shutter link 26 so that shutter 9 is also moved to its operated and inoperated positions, in accordance with the movement of control lever 11. It will be noted that the movement of control lever 11 to its operated or forward position does not directly move fork 10 to the left to cause the engagement of the gears, but that the movement of control lever 11 to its operated or forward position merely operates shifting cam 21 to such a position that it no longer holds fork 10 in its normal position, at the right as shown in Figs. 3 and 4, and that the force exerted by spring 18 is the actual force which shifts fork 10 to the left and causes the engagement of the gears. As a result, no matter how much force is applied to control lever 11 in operating it to its forward position, a constant predetermined force is always exerted to move gear 5 into engagement with gear 3. This feature offers an additional safeguard against damage to the gears.

The reset mechanism includes a reset coil spring 27 associated with said dial wheel, a stationary cup 28 inclosing said coil spring, a reset pawl stud 29 fastened to the side of gear 3, a reset stop pawl 30 and a spring 31 associated with said stop pawl. As indicated in Fig. 5, the inner end of the coil spring is fastened to hub 40 of the dial wheel. The outer end of said coil spring is fastened at 43 to a circular shoe 44 which is adapted to press against the side of stationary cup 28. When driving gear 5 is brought into engagement with gear 3, dial wheel 2 is caused to rotate, for example, as shown in Figs. 2 and 5 in a clockwise direction. With this direction of rotation, coil spring 27 tends to wind up. At first, as a result of the pressure of the shoe against the side of cup 28, the force exerted by the friction between said shoe and the side of said cup is greater than the force within said coil spring tending to cause said shoe and outer end to rotate with said dial wheel, and as a result said shoe and outer end remain stationary while the inner end rotates with the dial wheel. This, of course, winds up the coil spring. As the coil spring winds up, the force within the coil spring, caused by the winding up of said spring and tending to cause said shoe of said spring and tending to cause said shoe and outer end to rotate with the dial wheel, tends to overcome the friction between the shoe and the inside of cup 28. When said force within the coil spring exceeds the force exerted by the friction tending to maintain said shoe and outer end stationary, said shoe begins to slide along the side of cup 28 and to rotate with the dial wheel. As a result, the further rotation of the dial wheel causes no further winding up of the coil spring. On the other hand, during the further rotation of the dial wheel, the coil spring rotates with it and the energy stored up in the coil spring remains constant and dormant, so to speak, no matter how many revolutions the dial wheel makes. The stop pawl 30 is pivoted within the case, as shown in Fig. 2, in such a position that its lower arm 32 is above and in contact with stud 29 when the dial wheel is in its normal zero position. On the side of the stop pawl 30 is a second arm 35 upon which rests one end of spring 31. The other end of spring 31 is fastened between a spring block 36 and the case, as shown in Fig. 2. As the dial wheel rotates and the coil spring begins to wind up, stud 29 moves away from arm 32 of stop pawl 30. When the dial wheel has made almost one complete revolution, stud 29 comes in contact with the inner side of arm 32. The further rotation of the dial wheel causes stud 29 to press against arm 32 which, in turn, causes stop pawl 30 to swing counter-clockwise, as viewed in Figs. 2 and 5, against the force exerted by spring 31. This movement of the stop pawl permits stud 29 to pass arm 32 and hence permits the dial wheel to continue rotating in a clockwise direction. As soon as the stud passes, spring 31 forces the stop pawl back to its normal position. When driving gear 5 is disengaged from gear 3, the rotation of the dial wheel ceases. At this moment, the coil spring tends to unwind and to spread out. This increases the pressure of the shoe on the side of the cup and said shoe and outer end remain stationary while the coil spring unwinds. The unwinding of the coil spring, of course, causes the dial wheel to rotate in the opposite or counter-clockwise direction until stud 29 comes in contact with arm 32, at which time the dial wheel is in its normal zero position. The relative positions of stop pawl 30 and stud 29 are such that when stud 29 comes in contact with arm 32 at the end of the resetting operation, arm 32 tends to swing out against the force exerted by spring 31. This cushioning effect exerted by spring 31 prevents any substantial rebound or vibration of the dial wheel at this time and also prevents damage to the stud and stop pawl. The point at which the outer end of the coil spring begins to slide along the side of the stationary cup and hence at which the coil spring begins to rotate with the dial wheel depends, to some extent, upon the length and resiliency of the coil spring and upon the friction between the inside of cup 28 and the shoe to which the outer end of the coil spring is fastened. In general, if the coil spring is not wound up when the apparatus is originally assembled, the coil spring should be so designed and associated with hub 40 and stud 29 that it begins to rotate with the dial wheel when said dial wheel has rotated approximately one revolution or more. Thus it can be seen that dial wheel 2 can be rotated any number of revolutions or any part of a revolution and yet can be restored exactly to its normal zero position, no matter in what position it may be when it is desired to reset it.

Where it is desired to use a plurality of registers of the type described herein in a system in which a plurality of operations are to be measured, it might be preferable to provide a register for each device, the operation of which is to be measured, and to place the registers side by side so that a common driving force can be used to operate all the registers. Such an arrangement is shown in Figure 6. In such a case the registers 46 could be placed in a track in juxtaposition. The cross-section of such a track is shown at 37 in Fig. 1. It will be noted by reference to said figure and to Figure 6 that the edges 39 of the track are turned up in channel fashion. The bottom of the register case is provided at each end with a flange which is adapted to fit into the corresponding turned-up edge of the track. The registers are placed side by side in the track with the male end of the shaft 7 of each register (See Fig. 3) fitted in the female end of shaft of the adjacent register. The male or female end, as the case may be of one of the terminal registers is fitted in the female or male end, as the case may be, of the driving shaft of a constant speed motor 45, for example, which shaft is connected to the motor through suitable gearing apparatus. The other terminal register can be placed against an adjustable stop 47 to hold the registers in their proper positions and in tight engagement with each other. With the registers arranged in this manner the driving shafts 7 of all the registers in practical effect, form a common driving shaft which is divided into a plurality of sections with male and female ends, one section for each register. By providing the shafts with male and female ends and by arranging the registers in a track, as described above, any number of registers may be used and any register may be replaced or taken out at any time by sliding it off the track.

Although this invention has been described in connection with an elapsed time register which is adapted to be operated by a continuously operating driving shaft, it is to be understood that the apparatus and arrangement of apparatus constituting this invention and the features thereof may be used in connection with other types of measuring devices to measure any operation without departing from the spirit of the invention or the scope of the appended claims.

What is claimed is:

1. Measuring apparatus comprising, in combination, a freely mounted rotatable dial element adapted normally to remain stationary in a predetermined position, a freely mounted cog-wheel gear connected to said rotatable element, a cog-wheel driving gear adapted, when in engagement with said freely mounted gear, to rotate said freely mounted gear and said dial element in a forward direction, shifting means adapted to move said driving gear in the direction of the axes of said gears into engagement with said freely mounted gear, control means for controlling the operation of said shifting means in order to start the rotation of said dial element, as desired, and means prepared for operation by the forward rotation of said dial element and operative, when said gears are disengaged, to rotate said dial element in a reverse direction to its normal predetermined position.

2. Measuring apparatus comprising, in combination, a rotatable dial element, a gear connected to said rotatable element, driving gear means adapted to rotate said rotatable element, shifting means for causing the engagement and disengagement of said driving gear means and the gear of said rotatable element, control means for controlling the operation of said shifting means in order to start the rotation of said rotatable element as desired, and means associated with said shifting means and said driving gear means and adapted to permit the full operation of said control means and said shifting means even though said gears do not at once mesh and to cause the engagement of said gears when they are later in meshing position.

3. A register comprising, in combination, a freely mounted dial wheel, a freely mounted gear connected to said dial wheel, a driving shaft, gear means adapted to be rotated by said driving shaft and including a gear hub slidably mounted on said shaft, a driving gear connected to one end of said hub adjacent said dial wheel gear, and a collar connected to the other end of said hub, a shifting hub slidably mounted on said gear hub, a first spring wound around said gear hub between said collar and said shifting hub, shifting means adapted, when operated, to move said driving gear into engagement with said dial wheel gear if the teeth of said gears are in meshing position, and a second spring adapted, when released, to exert a constant predetermined shifting force and to operate said shifting means, said first spring being adapted, if the teeth of said gears are not in meshing position, to permit the full movement of said shifing means to its operated position and later to cause the engagement of said gears when said driving gear rotates to a meshing position.

4. In combination, a rotatable element, a gear connected to said rotatable element, a driving gear adapted to rotate said rotatable element, manually operated shifting means adapted, when in a first position, to disengage said gears from each other and, when in a second position, to cause the engagement of said gears, control means adapted, when in its unoperated position to hold said shifting means in its first position and, when in its operated position, to permit the movement of said shifting means to its second position, and means operative when said control means is moved to its operated position to exert a constant predetermined shifting force and to cause the movement of said shifting means to its second position.

5. Measuring apparatus comprising, in combination, a measuring wheel, a gear connected to said measuring wheel, a driving gear adapted to rotate said measuring wheel, manually operated shifting means adapted, when in a first position, to disengage said gears from each other and, when in a second position, to cause the engagement of said gears, spring means associated with said shifting means and adapted to be compressed when said shifting means is in its first position, and control means including a shifting cam adapted, when said control means is in its unoperated position to hold said shifting means in its first position against the force exerted by said compressed spring and adapted, when said control means is in its operated position to permit the movement of said shifting means to its second position, said compressed spring being operative when said control means is moved to its operated position to cause a constant predetermined shifting force and to cause the movement of said shifting means to its second position.

6. In combination, a freely mounted rotatable element, a freely mounted driven gear connected to said rotatable element, a driving gear adapted to rotate said driven gear when in engagement therewith, shifting means adapted, when operated to a first position, to disengage said gears from each other and, when operated to a second position, to cause the engagement of said gears if the teeth of said gears are in meshing position, control means adapted, when in its unoperated position, to hold said shifting means in its first position and, when moved to its operated position, to permit the full movement of said shifting means to its second position, means operative, when said control means is moved to its operated position, to exert a constant predetermined shifting force and to cause the full movement of said shifting means to its second position even though the teeth of said gears are not in meshing position, and means associated with said shifting means and one of said gears and adapted to permit the full movement of said shifting means to its second position even though said gears do not at once mesh and to cause the engagement of said gears when said gears are later in meshing position.

7. A register comprising, in combination, a freely mounted rotatable dial element, a freely mounted driven gear connected to said dial element, a driving gear adapted to rotate said driven gear when in engagement therewith, shifting means adapted, when operated to a first position, to disengage said gears from each other and, when operated to a second position, to cause the engagement of said gears if the teeth of said gears are in meshing position, control means adapted, when in its unoperated position, to hold said shifting means in its first position and, when moved to its operated position, to permit the full movement of said shifting means to its second position, a first spring means operative, when said control means is moved to its operated position, to exert a constant predetermined shifting force and to cause the full movement of said shifting means to its second position even though the teeth of said gears are not in meshing position, and a second spring means associated with said shifting means and one of said gears and adapted to permit the full movement of said shifting means to its second position even though said gears do not at once mesh and to cause the engagement of said gears when said gears are later in meshing position.

8. Measuring apparatus comprising, in combination, a freely mounted rotatable dial element, a freely mounted cogwheel gear connected to said dial element, a cogwheel driving gear adapted to rotate said freely mounted gear, and shifting means adapted to move one of said gears in the direction of the axes of said gears into engagement with the other of said gears to cause the rotation of said freely mounted gear and said dial element by said driving gear.

9. A register comprising, in combination, a rotatable dial element, a cogwheel driven gear connected to said dial element, a cogwheel driving gear adapted to rotate said driven gear and said dial element in a forward direction when in engagement with said driven gear, shifting means adapted to move one of said gears in the direction of the axes of said gears into and out of engagement with the other of said gears, and means associated with said dial element and adapted to be prepared for operation by the forward rotation of said dial element through a predetermined distance and to rotate with said dial element as the dial element rotates beyond said predetermined distance, said latter means being operative, when said gears are disengaged, to rotate said dial element in a reverse direction until said dial element reaches the position it occupied prior to its forward rotation.

10. In combination, a plurality of time indicating means, each having a rotatable dial element adapted normally to remain stationary in a predetermined position and a driving gear connected to said dial element, a common, constant-speed driving means for operating said time indicating means, a driving gear individual to each driven gear and adapted to be rotated at a constant speed by said driving means and to rotate the corresponding driven gear when in engagement therewith, shifting means individual to each pair of said gears and adapted, when operated to a first position, to disengage its corresponding pair of gears from each other and, when operated to a second position, to cause the full engagement of its corresponding pair of gears when the teeth thereof are in meshing position, control means individual to each shifting means and adapted, when in an unoperated position, to hold the corresponding shifting means in its first position and, when in an operated position, to permit the full movement of the corresponding shifting means to its second position, means individual to each shifting means and operative, when the corresponding control means is moved to its operated position, to exert a constant predetermined shifting force and to cause the movement of the corresponding shifting means to its second position even though the teeth of the corresponding pair of gears are not in exact meshing position, and means individual to each pair of said gears and rendered operative by the full movement of the corresponding shifting means to its second position when the teeth of the corresponding pair of gears are not in meshing position, to move one of the corresponding pair of gears into full engagement with the other at the same speed as that at which the driving gears are being rotated by said common driving means.

11. In combination, a plurality of time indicating means, each having a rotatable dial element adapted normally to remain stationary in a predetermined position and a cogwheel driven gear connected to said dial element, a common, constant-speed driving means for operating said time indicating means, a cogwheel driving gear individual to each driven gear and adapted to be rotated at a constant speed by said driving means and to rotate the corresponding driven gear when in engagement therewith, and shifting means individual to each pair of said gears and adapted to move one of the corresponding pair of gears in the direction of the axes of the corresponding pair of gears into engagement with the other to start the rotation of the corresponding dial element, as desired.

EDWARD A. SLYE.